US009996760B2

(12) United States Patent
Kalyuzhny

(10) Patent No.: US 9,996,760 B2
(45) Date of Patent: Jun. 12, 2018

(54) OPTICAL CHARACTER RECOGNITION OF SERIES OF IMAGES

(71) Applicant: ABBYY Development LLC, Moscow (RU)

(72) Inventor: Aleksey Kalyuzhny, Moscow Oblast (RU)

(73) Assignee: ABBYY DEVELOPMENT LLC, Moscow (RU)

( * ) Notice: Subject to any disclaimer, the term of this patent is extended or adjusted under 35 U.S.C. 154(b) by 120 days.

(21) Appl. No.: 15/168,525

(22) Filed: May 31, 2016

(65) Prior Publication Data
US 2017/0330048 A1    Nov. 16, 2017

(30) Foreign Application Priority Data

May 13, 2016 (RU) ................................ 2016118633

(51) Int. Cl.
*G06K 9/00* (2006.01)
*G06K 9/32* (2006.01)
(Continued)

(52) U.S. Cl.
CPC ......... *G06K 9/325* (2013.01); *G06K 9/00449* (2013.01); *G06K 9/00483* (2013.01);
(Continued)

(58) Field of Classification Search
CPC .. G06K 9/56; G06K 9/60; G06K 9/72; G06K 9/325; G06K 9/00449; G06K 9/00483;
(Continued)

(56) References Cited

U.S. PATENT DOCUMENTS 6,975,761 B1 *  12/2005  Swann ............... G06K 9/00463
                                                    382/173
7,370,034 B2 *   5/2008  Franciosa ......... G06F 17/30011
                                                    707/749
(Continued)

FOREIGN PATENT DOCUMENTS

EP       2801053 A1    11/2014
WO    2014107246 A1     7/2014
(Continued)

*Primary Examiner* — Amara Abdi
(74) *Attorney, Agent, or Firm* — Lowenstein Sandler LLP

(57) ABSTRACT

Systems and methods are described for receiving a current image that partially overlaps with a previous image of a series of images of an original document; performing optical character recognition (OCR) of the current image, producing an OCR text and a corresponding text layout; identifying textual artifacts in the current and previous images, each represented by a sequence of symbols having a frequency of occurrence within the OCR text below a threshold frequency; identifying corresponding base points associated with textual artifacts; identifying parameters of a coordinate transformation converting coordinates of the previous image into coordinates of the current image; associating part of the OCR text with a cluster of symbol sequences, wherein the symbol sequences are produced by processing previously received images; identifying an order of clusters of symbol sequences reflecting a layout of the original document; and producing a resulting OCR text representing a portion of the original document.

22 Claims, 7 Drawing Sheets

(51) Int. Cl.
G06K 9/62 (2006.01)
G06T 3/40 (2006.01)
G06K 9/46 (2006.01)
G06T 7/00 (2017.01)

(52) U.S. Cl.
CPC ......... G06K 9/4604 (2013.01); G06K 9/6218 (2013.01); G06K 9/6267 (2013.01); G06T 3/40 (2013.01); G06T 7/0085 (2013.01)

(58) Field of Classification Search
CPC .. G06K 9/4604; G06K 9/6218; G06K 9/6267; G06T 1/00; G06T 3/40; G06T 7/0085; G06F 17/28
See application file for complete search history.

(56) References Cited

U.S. PATENT DOCUMENTS

| | | | |
|---|---|---|---|
| 7,620,268 B2 | 11/2009 | Myers et al. | |
| 7,840,033 B2 | 11/2010 | Kurzweil et al. | |
| 9,058,536 B1 | 6/2015 | Yuan et al. | |
| 9,064,174 B2 * | 6/2015 | Nister | G06K 9/3266 |
| 9,349,066 B2 * | 5/2016 | Koo | G06K 9/00671 |
| 2002/0186425 A1 * | 12/2002 | Dufaux | G06K 9/20 358/497 |
| 2005/0271281 A1 * | 12/2005 | Simard | G06K 9/00442 382/225 |
| 2007/0003147 A1 * | 1/2007 | Viola | G06F 17/271 382/229 |
| 2007/0168382 A1 * | 7/2007 | Tillberg | G06F 17/30253 |
| 2009/0077617 A1 * | 3/2009 | Levow | H04L 51/12 726/1 |
| 2014/0192210 A1 * | 7/2014 | Gervautz | G06K 9/228 348/207.1 |
| 2014/0369556 A1 * | 12/2014 | Zagaynov | G06T 3/4053 382/103 |
| 2015/0169951 A1 * | 6/2015 | Khintsitskiy | G06K 9/00483 382/182 |

FOREIGN PATENT DOCUMENTS

| | | | | |
|---|---|---|---|---|
| WO | 2015165524 A1 | 11/2015 | | |
| WO | WO 2015/165524 | * 11/2015 | ............... | G06K 9/32 |

* cited by examiner

OPTICAL CHARACTER RECOGNITION OF SERIES OF IMAGES

CROSS REFERENCE TO RELATED APPLICATIONS

The present application claims the benefit of priority under 35 USC 119 to Russian patent application no. 2016118633, filed May 13, 2016. This application is also related to U.S. patent application Ser. No. 15/168,548, filed May 31, 2016; the disclosure of priority application is herein incorporated by reference in its entirety for all purposes.

TECHNICAL FIELD

The present disclosure is generally related to computer systems, and is more specifically related to systems and methods for optical character recognition (OCR).

BACKGROUND

Optical character recognition (OCR) is a computer-implemented conversion of text images (including typed, handwritten, or printed text) into computer-encoded electronic documents.

SUMMARY OF THE DISCLOSURE

In accordance with one or more aspects of the present disclosure, an example method for performing optical character recognition (OCR) of a series of images depicting symbols of a certain alphabet may comprise: receiving a current image of a series of images of an original document, wherein the current image at least partially overlaps with a previous image of the series of images; performing optical symbol recognition (OCR) of the current image to produce an OCR text and a corresponding text layout; identifying, using the OCR text and the corresponding text layout, a plurality of textual artifacts in each of the current image and the previous image, wherein each textual artifact is represented by a sequence of symbols that has a frequency of occurrence within the OCR text falling below a threshold frequency; identifying, in each of the current image and the previous image, a corresponding plurality of base points, wherein each base point is associated with at least one textural artifact of the plurality of textual artifacts; identifying, using coordinates of matching base points in the current image and the previous image, parameters of a coordinate transformation converting coordinates of the previous image into coordinates of the current image; associating, using the coordinate transformation, at least part of the OCR text with a cluster of a plurality of clusters of symbol sequences, wherein the OCR text is produced by processing the current image and wherein the symbol sequences are produced by processing one or more previously received images of the series of images; identifying an order of clusters of symbol sequences, the order reflecting a layout of the original document; and producing, in view of the order of clusters, a resulting OCR text representing at least a portion of the original document.

In accordance with one or more aspects of the present disclosure, an example system for performing optical character recognition (OCR) of a series of images depicting symbols of a certain alphabet may comprise: a memory; a processing device, coupled to the memory, the processing device configured to: receive a current image of a series of images of an original document, wherein the current image at least partially overlaps with a previous image of the series of images; perform optical symbol recognition (OCR) of the current image to produce an OCR text and a corresponding text layout; identify, using the OCR text and the corresponding text layout, a plurality of textual artifacts in each of the current image and the previous image, wherein each textual artifact is represented by a sequence of symbols that has a frequency of occurrence within the OCR text falling below a threshold frequency; identify, in each of the current image and the previous image, a corresponding plurality of base points, wherein each base point is associated with at least one textural artifact of the plurality of textual artifacts; identify, using coordinates of matching base points in the current image and the previous image, parameters of a coordinate transformation converting coordinates of the previous image into coordinates of the current image; associate, using the coordinate transformation, at least part of the OCR text with a cluster of a plurality of clusters of symbol sequences, wherein the OCR text is produced by processing the current image and wherein the symbol sequences are produced by processing one or more previously received images of the series of images; identify an order of clusters of symbol sequences, the order reflecting a layout of the original document; and produce, in view of the order of clusters, a resulting OCR text representing at least a portion of the original document.

In accordance with one or more aspects of the present disclosure, an example computer-readable non-transitory storage medium may comprise executable instructions that, when executed by a processing device, cause the processing device to: receive a current image of a series of images of an original document, wherein the current image at least partially overlaps with a previous image of the series of images; perform optical symbol recognition (OCR) of the current image to produce an OCR text and a corresponding text layout; identify, using the OCR text and the corresponding text layout, a plurality of textual artifacts in each of the current image and the previous image, wherein each textual artifact is represented by a sequence of symbols that has a frequency of occurrence within the OCR text falling below a threshold frequency; identify, in each of the current image and the previous image, a corresponding plurality of base points, wherein each base point is associated with at least one textural artifact of the plurality of textual artifacts; identify, using coordinates of matching base points in the current image and the previous image, parameters of a coordinate transformation converting coordinates of the previous image into coordinates of the current image; associate, using the coordinate transformation, at least part of the OCR text with a cluster of a plurality of clusters of symbol sequences, wherein the OCR text is produced by processing the current image and wherein the symbol sequences are produced by processing one or more previously received images of the series of images; identify an order of clusters of symbol sequences, the order reflecting a layout of the original document; and produce, in view of the order of clusters, a resulting OCR text representing at least a portion of the original document.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
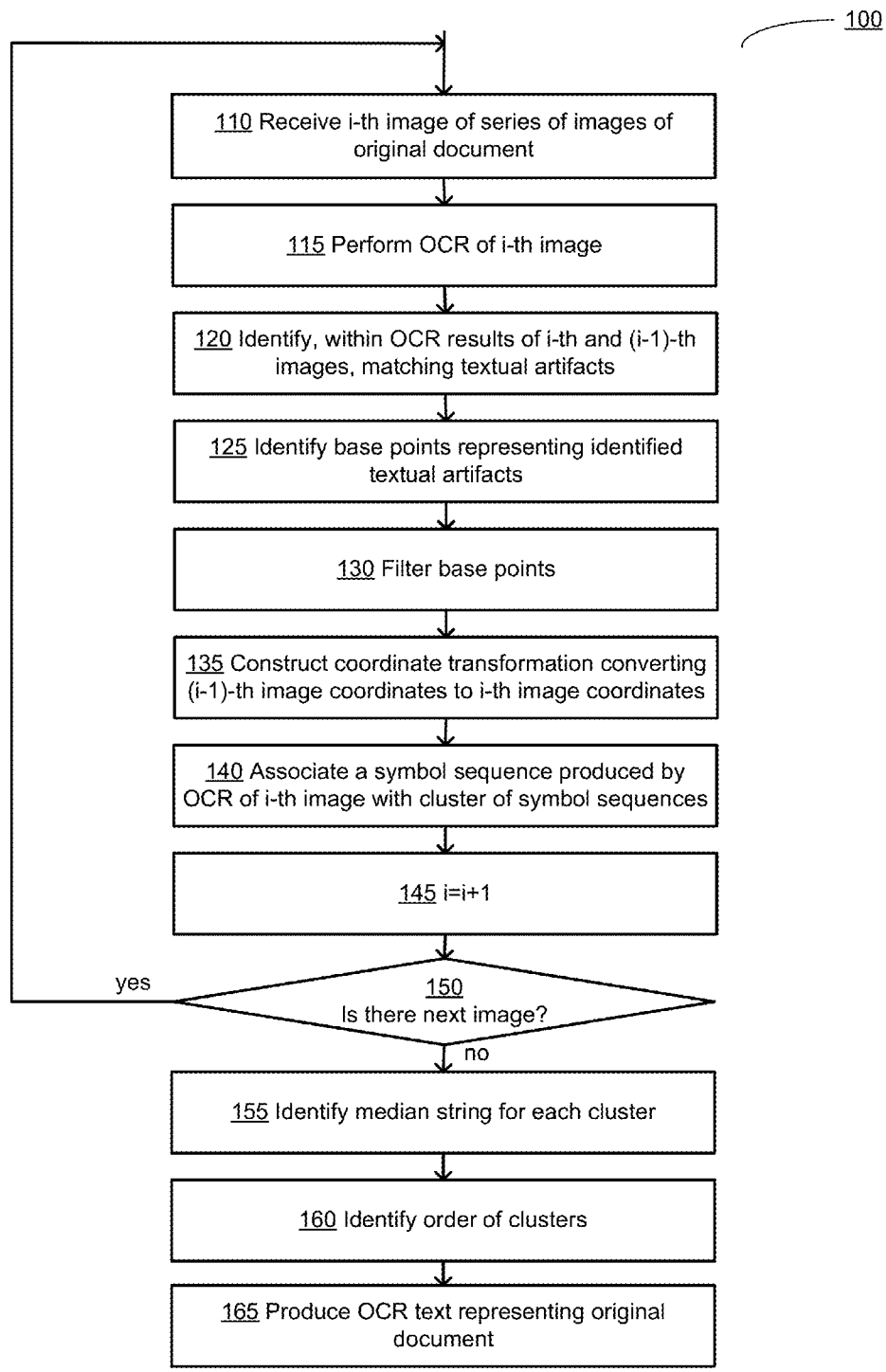
FIG. 1 depicts a flow diagram of one illustrative example of a method for performing optical character recognition (OCR) of a series of images comprising text symbols, in accordance with one or more aspects of the present disclosure.

Described herein are methods and systems for performing optical character recognition (OCR) of a series of images depicting symbols of a certain alphabet. The alphabets whose symbols may be processed by the systems and methods described herein include true alphabets that have separate symbols, or glyphs, representing individual sounds, as well as hieroglyphic alphabets that have separate symbols representing larger units such as syllables or words.

In the following description, the term "document" shall be interpreted broadly as referring to a wide variety of text carrying media, including but not limited to printed or handwritten paper documents, banners, posters, signs, billboards, and/or other physical objects carrying visible text symbols on one or more of their surfaces. "Document image" herein shall refer to an image of at least a part of the original document (e.g., a page of a paper document).

An OCR system may acquire a document image and transform the acquired image into a computer-readable and searchable format comprising the textual information extracted from the image of the paper document. The OCR process may be hindered by various image defects, such as visual noise, poor focus or image clarity, glares, etc., which may be routinely caused by the camera shake, inadequate illumination, incorrectly chosen shutter speed or aperture, and/or other conditions and attenuating circumstances. While common OCR methods may not always correctly perform character recognition in the presence of the above-noted and other image defects, the systems and methods described herein may significantly improve the OCR quality by analyzing a series of images (e.g., a sequence of video frames or still images) of the document, as described in more details herein below.

Furthermore, in certain circumstances, the original document cannot be fit into a single image without a significant loss of the image quality. The loss of image quality may be mitigated by acquiring a series of partially overlapping images of multiple fragments of the original document, which, however, may not be suitable for the subsequent OCR processing by common OCR methods. The systems and methods described herein may efficiently combine the results of character recognition performed for the multiple document fragments to produce the text of the original document.

In certain implementations, the text produced by the OCR systems and methods described herein may be further processed, e.g., by machine translation methods for translating the original text into another natural language.

In an illustrative example, a computer system implementing the methods described herein may receive a series of images (e.g., a sequence of video frames or still images) of the original document. The images may depict at least partially overlapping document fragments, and may differ by the image scale, shooting angle, shutter speed, aperture, image brightness, glaring, presence of external objects that at least partially cover the original text, and/or other image features, visual artifacts, and imaging process parameters.

The computer system may perform OCR of at least selected images of the received series of images to produce the corresponding text and layout information. The layout information may associate the recognized symbols and/or groups of symbols with their respective positions in the original image. In order to combine the results of character recognition performed for consecutively received images, the computer system may compare the text and layout produced by OCR of the currently received image with the text and layout produced by OCR of one or more of previously processed images.

In accordance with one or more aspects of the present disclosure, the computer system may identify matching textual artifacts in the OCR results representing a pair of images (e.g., a pair of consecutive images of the series of images), in order to identify base points for constructing inter-image coordinate transformations, such that each coordinate transformation translates coordinate of the previous image into coordinates of the subsequent image of the pair of images, as described in more details herein below. The textual artifacts utilized for identifying the base points may be represented by sequences of symbols (e.g., words) having a low frequency of occurrence within the OCR produced text (e.g., the frequency that does not exceed a specified frequency threshold).

The layout information associated with the identified textual artifacts allows identifying at least one base point representing each textual artifact within each of the pair of images. In an illustrative example, a base point may represent the center and/or the corners of the minimum bounding rectangle of a unique of low-frequency sequence of symbols.

The base point coordinates may then be used to construct the inter-image coordinate transformations. Each coordinate transformation may then be used to compare positions of various recognized symbol sequences in the respective images and thus identify, within OCR results produced by processing the series of images, clusters of symbol sequences that are likely to represent the same fragment of the original document.

For each cluster of matching symbol sequences, the median string representing the OCR result of the associated image fragment may be identified. In certain implementations, the median string may be identified as the symbol sequence having the minimal sum of edit distances to all symbol sequences of the cluster. The edit distance, which may in an illustrative example be represented by the Levenshtein distance, between a first symbol sequence and a second symbol sequence may be equal to the minimum number of single-symbol edits (i.e. insertions, deletions or substitutions) required to transform the first symbol sequence into the second symbol sequence.

The texts produced by the OCR of each individual image may differ by one or more words being present or absent in each OCR result, by variations in the symbol sequences representing the words of the original text, and/or by the order of the symbol sequences. In order to reconstruct the correct order of the symbol sequences in the original document, a plurality of permutations of the symbol sequences that represent the identified clusters may be analyzed to identify the median that has the minimal sum of Kendall tau distances to all other permutations. The Kendall tau distance between a first permutation and a second permutation may be equal to the minimum number of swapping operations required by the bubble sort algorithm to transform the first permutation into the second permutation.

Various aspects of the above referenced methods and systems are described in details herein below by way of examples, rather than by way of limitation.

FIG. 1 depicts a flow diagram of one illustrative example of a method 100 for performing OCR of a series of images comprising text symbols, in accordance with one or more aspects of the present disclosure. Method 100 and/or each of its individual functions, routines, subroutines, or operations may be performed by one or more processors of the computer system (e.g., example computer system 800 of FIG. 8) executing the method. In certain implementations, method 100 may be performed by a single processing thread. Alternatively, method 100 may be performed by two or more processing threads, each thread executing one or more individual functions, routines, subroutines, or operations of the method. In an illustrative example, the processing threads implementing method 100 may be synchronized (e.g., using semaphores, critical sections, and/or other thread synchronization mechanisms). Alternatively, the processing threads implementing method 100 may be executed asynchronously with respect to each other. Therefore, while FIG. 1 and the associated description lists the operations of method 100 in certain order, various implementations of the method may perform at least some of the described operations in parallel and/or in arbitrary selected orders.

For clarity and conciseness, the present description assumes that the processing of each image of an original document is initiated after the image is received by the computer system implementing the method, and that such processing is substantially completed before the next image is received. However, in various alternative implementations, processing of consecutive images may overlap in time (e.g., may be performed by different threads or processes that are running on one or more processors). Alternatively, two or more images may be buffered and processed asynchronously with respect to receiving the other images of a plurality of images received by the computer system implementing the method.

The present disclosure references "a pair of images" of a series of images (e.g., a sequence of video frames or still images) of the original document. The images may depict at least partially overlapping document fragments, and may differ by the image scale, shooting angle, shutter speed, aperture, image brightness, glaring, presence of external objects that at least partially cover the original text, and/or other image features, visual artifacts, and imaging process parameters. In an illustrative example, the pair of images may be selected among two or more consecutive images of the received series of images. The two images are individually referenced herein as "the current image" (also referred to as "i-th image" in FIG. 1) and "the previous image" (also referred to as "(i-1)-th image" in FIG. 1).

At block 110, the computer system implementing the method may receive the current image of the series of images.

At block 115, the computer system may perform the optical character recognition of the current image, thus producing the recognized text and layout information. The layout information may associate the recognized symbols and/or groups of symbols with their respective positions in the image.

At block 120, the computer system may identify matching textual artifacts in the OCR results representing the pair of images. A textual artifact may be represented by a sequence of symbols (e.g., words) having a low frequency of occurrence within the OCR produced text (e.g., the frequency that does not exceed a specified frequency threshold, which may be set to 1 to reference a unique sequence of symbols). In an illustrative example, a low frequency word may be identified by sorting the OCR-produced words in the order of their respective frequencies and selecting a word having the lowest frequency. In certain implementations, only sequences of symbols, the respective lengths of which exceed a certain threshold length may be utilized by the method, since shorter sequences of symbols produce less reliable base points.

At block 125, the computer system may employ the layout information associated with the identified textual artifacts to identify at least one base point representing each textual artifact within each image of the pair of images. In an illustrative example, a base point associated with the identified sequence of symbols may be represented by the center of the minimum bounding rectangle of the sequence of symbols. In another illustrative example, two or more base points associated with the identified sequence of symbols may be represented by the corners of the minimum bounding rectangle of the sequence of symbols.

Figure 2A:
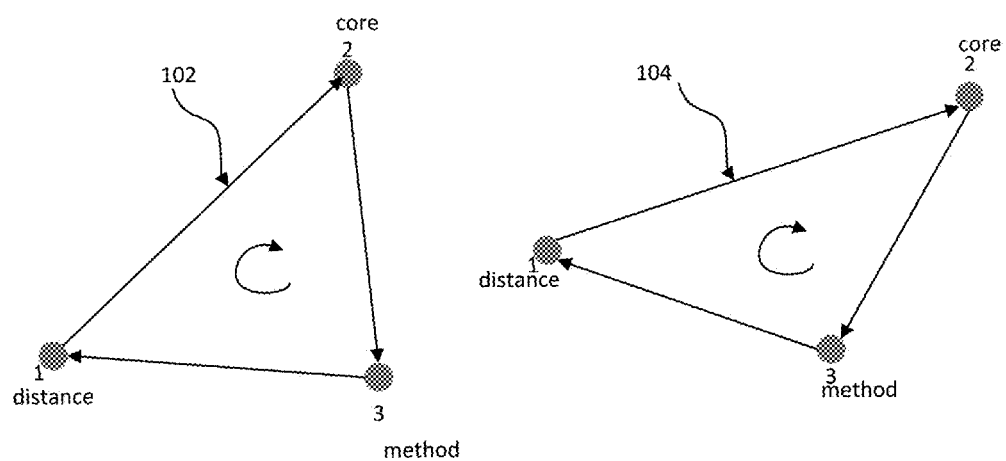
FIG. 2A schematically illustrates filtering the identified base points using invariant geometric features of base point groupings, in accordance with one or more aspects of the present disclosure.
Figure 2B:
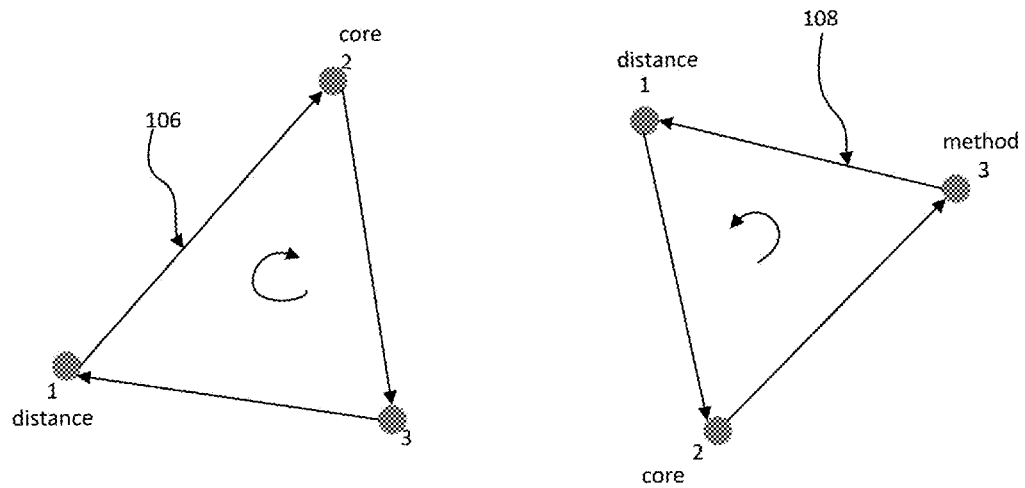
FIG. 2B schematically illustrates filtering the identified base points using invariant geometric features of base point groupings, in accordance with one or more aspects of the present disclosure.

At block 130, the computer system may inspect the identified base points and discard at least some of them in view of the chosen filtering criteria. In an illustrative example, the computer system may verify that arbitrarily selected groups of the matching base points exhibit certain geometric features that are invariant with respect to the chosen images. As schematically illustrated by FIGS. 2A-2B, such an invariant geometric feature may be represented by the direction of the path traversing at least three matching base points. In the example of FIG. 2A, three low frequency words ("distance," "core," and "method") are employed for producing the respective base points 1, 2, and 3. The centers of the minimum bounding rectangles of the corresponding sequences of symbols in each of the document images produce the rectangles 102 and 104. In the example of FIG. 2A, in each of the two depicted images, the direction of the triangular paths traversing the base points in the order of their numerical designators is the same, i.e., the clockwise direction, and hence the base points 1, 2, and 3 are likely to represent the matching sequences of symbols in the two images, and therefore may be relied upon for performing subsequent operations of the method.

Conversely, in the example of FIG. 2B, for the rectangle 106 corresponding to the first document image, the direction of the triangular paths traversing the base points in the order of their numerical designators is clockwise, while for the rectangle 108 corresponding to the second document image, the direction of the triangular paths traversing the base points in the order of their numerical designators is counterclockwise, and hence the base points 1, 2, and 3 are likely to represent the different sequences of symbols in the two images, and therefore should be discarded.

Figure 3:
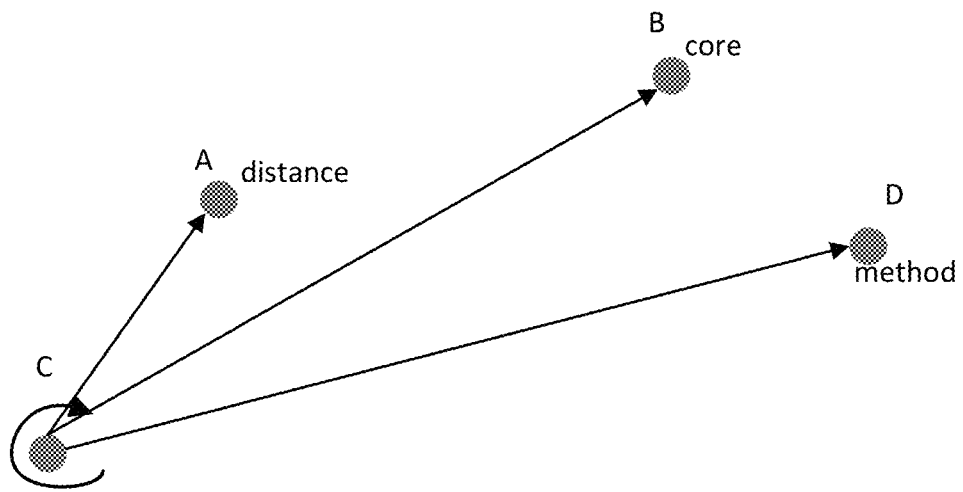
FIG. 3 schematically illustrates an example path traversing the vectors connecting an arbitrary chosen point (e.g., the origin of the coordinate plane associated with the image) and each of the base points, in the order of their numerical designators, in accordance with one or more aspects of the present disclosure.
Figure 4:
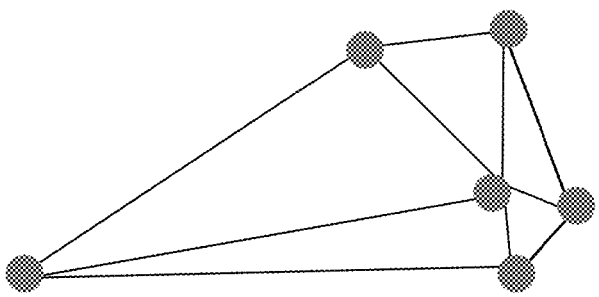
FIG. 4 schematically illustrates an example topology of geometric shapes produced by the lines connecting an arbitrary chosen set of base points, in accordance with one or more aspects of the present disclosure.

As schematically illustrated by FIG. 3, an additional or alternative invariant geometric feature may be represented by the direction of the path traversing the vectors connecting an arbitrary chosen point (e.g., the origin of the coordinate plane associated with the image) and each of the base points, in the order of their numerical designators. As schematically illustrated by FIG. 4, an additional or alternative invariant geometric feature may be represented by the topology of geometric shapes produced by the lines connecting an arbitrary chosen set of base points.

In various implementations, alternative methods of identifying the image features, producing the base points, and/or filtering the base points may be employed.

Referring again to FIG. 1, at block 135, the computer system may construct the coordinate transformation converting coordinates of one image of the pair of images into coordinates of another image of the pair of images. The present method assumes that, at least for the chosen pairs of images, coordinates of an arbitrary chosen point in the first image may be produced by applying a projective transformation to the coordinates of the same point in the second image.

"Projective transformation" herein refers to a transformation that maps lines to lines, but does not necessarily preserve parallelism. A projective transformation can be expressed by the following equations:

$$X = \frac{Ax_1 * x + Ax_2 * y + Ax_3}{Ax_4 * x + Ay_4 * y + 1} \quad (1)$$

$$Y = \frac{Ay_1 * x + Ay_2 * y + Ay_3}{Ax_4 * x + Ay_4 * y + 1} \quad (2)$$

wherein (x,y) and (X,Y) represent coordinates of an arbitrary chosen point in the first image and the second image, respectively. The transformation coefficients $Ax_1$, $Ax_2$, $Ax_3$, $Ax_4$, $Ay_1$, $Ay_2$, $Ay_3$, and $Ay_4$ may be determined based on known coordinates of at least four base points in each of the two images, which would produce a system of eight equations with eight variables. Once the transformation coefficients have been determined, the equations (1) and (2) may be applied to coordinates of an arbitrary chosen point in the first image in order to determine coordinates of the same point in the second image.

In certain implementations, more than four pair of base points may be identified for a given pair of images by operations referenced by blocks 125-130, in which case the over-determined system may be resolved by regression analysis methods, such as the method of least squares.

Figure 5:
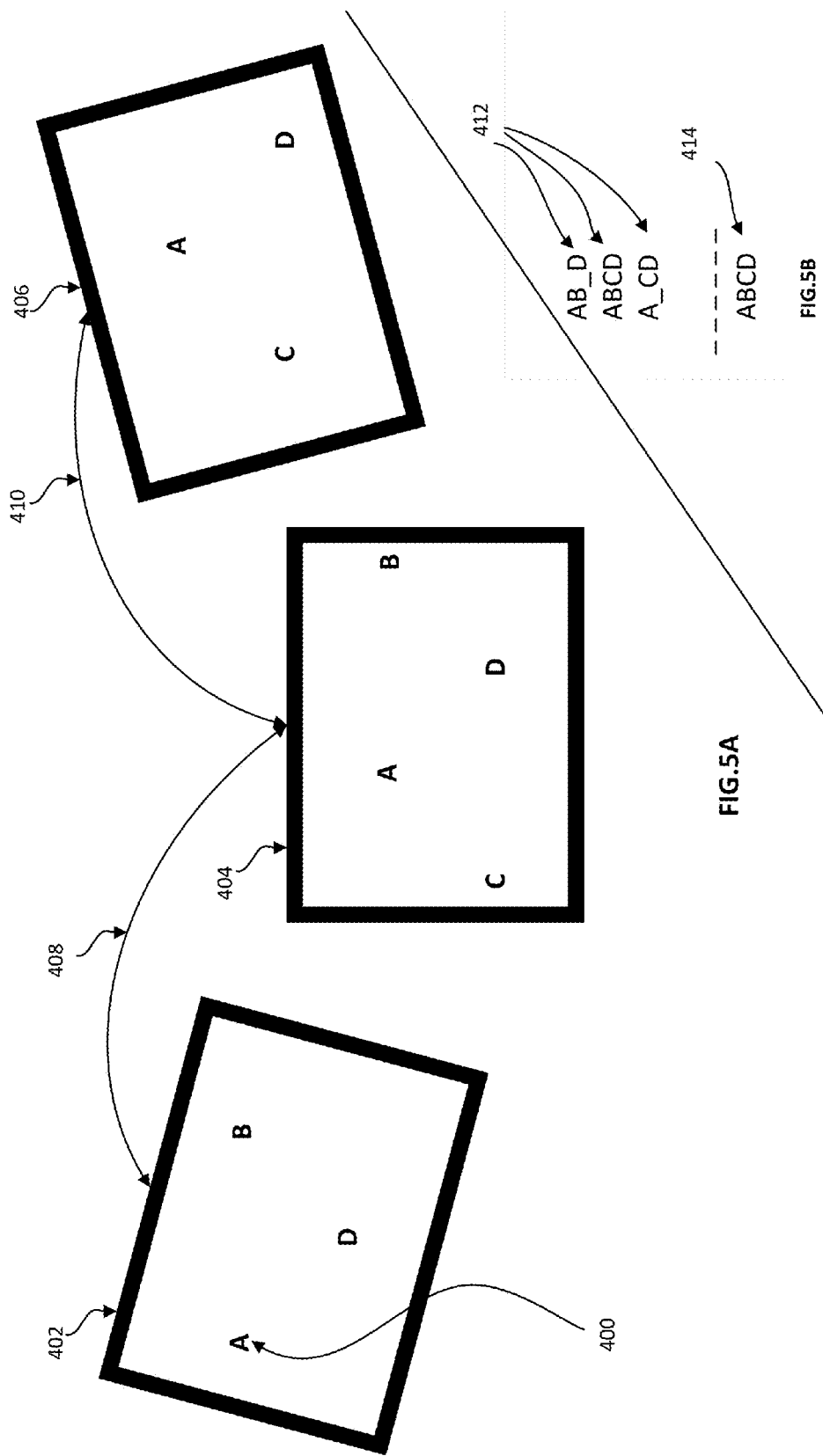
FIG. 5A schematically illustrates an example sequence of three images, projective transformations between pairs of images, and the corresponding symbol sequences produced by the OCR of the respective images, in accordance with one or more aspects of the present disclosure.
FIG. 5B schematically illustrates an example sequence of three images, projective transformations between pairs of images, and the corresponding symbol sequences produced by the OCR of the respective images, in accordance with one or more aspects of the present disclosure.

FIG. 5A schematically illustrates a sequence of three images 402, 404, and 406, such that the coordinates of the first image 402 may be translated into the coordinates of the second image 404 by applying the projective transformation 408, and the coordinates of the second image 404 may be translated into the coordinates of the third image 406 by applying the projective transformation 410.

Referring again to FIG. 1, at block 140, the computer system may associate one or more symbol sequences produced by OCR of the current image with a cluster of matching symbol sequences produced by OCR of the previously processed images. The computer system may employ the above-referenced coordinate transformations to compare positions of recognized symbol sequences in the current and previous images, and thus identify groups of symbol sequences that are likely to represent the same fragment of the original document.

In an illustrative example, for an arbitrary chosen symbol sequence in a text produced by the optical character recognition of the current image, the method may identify one or more matching symbol sequences produced by the optical character recognition of other images of the series of images. Notably, "matching symbol sequences" herein refers to both strictly matching and fuzzily matching symbol sequences. In an illustrative example of FIG. 5B, the three matching symbol sequences 412, corresponding to the images 402, 404, and 406, are represented by three different sequences, which are fuzzily matched by the methods described herein.

Figure 6:
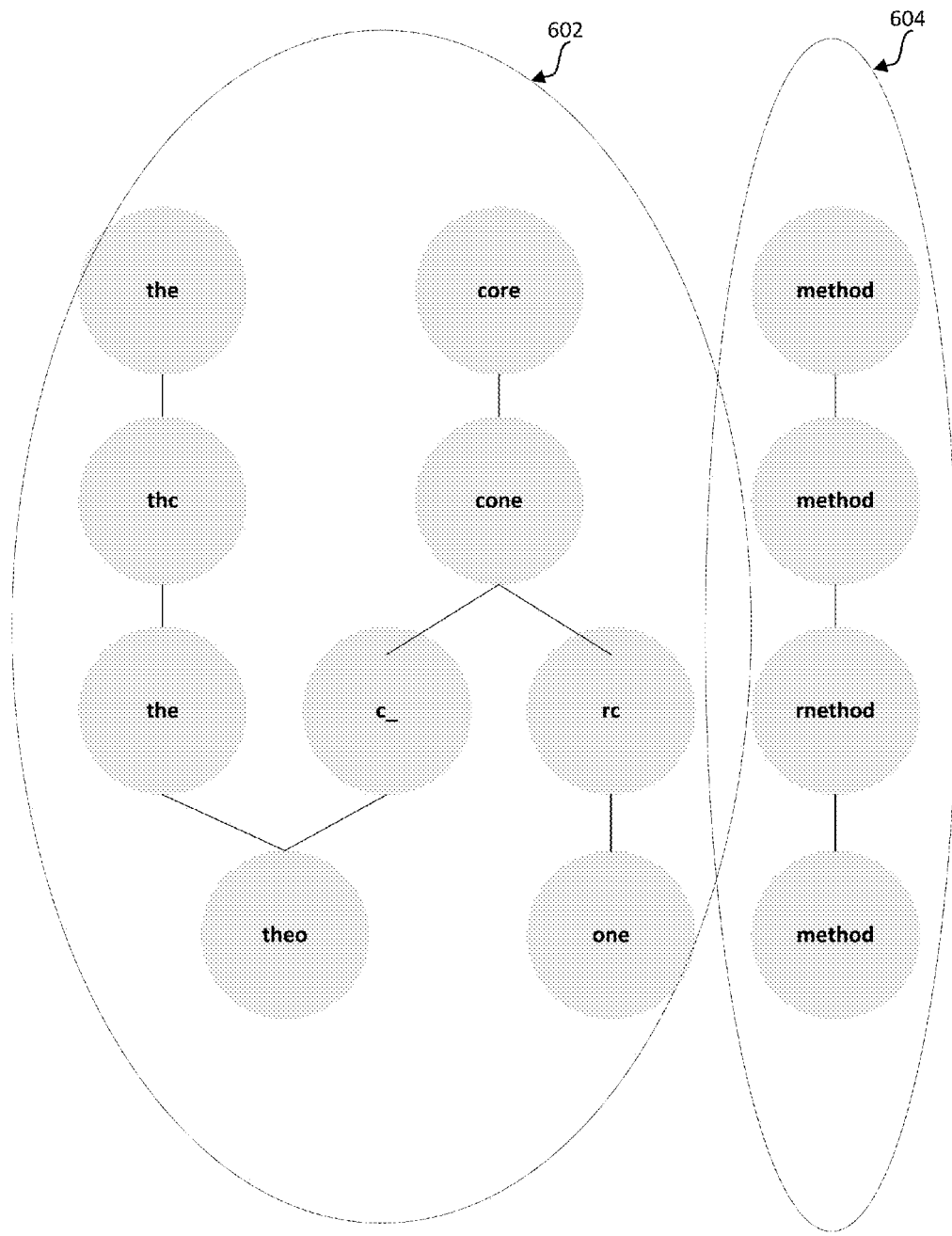
FIG. 6 schematically illustrates an example graph comprising a plurality of clusters of vertices, such that each cluster represents two or more matching symbol sequences, in accordance with one or more aspects of the present disclosure.

In certain implementations, the computer system may produce a graph, the vertices of which represent symbol sequences from the plurality of images, and edges interconnect the symbol sequences that have been identified as matching (i.e., representing the same fragment of the original text) by applying the above-referenced inter-image coordinate transformations. As schematically illustrated by FIG. 6, the resulting graph would comprise a plurality of clusters of vertices, such that each cluster represents two or more matching symbol sequences. The vertices within each cluster are interconnected by respective edges, while individual clusters may be isolated or weakly connected to each other. FIG. 6 shows two clusters (602, 604) representing OCR produced symbol sequences for two original strings: "the core" and "method."

Referring again to FIG. 1, at block 145, the computer system may increment the counter referencing the current image in the series of images. Notably, operations of block 145 are presented in FIG. 1 for readability of the associated description, and may be omitted in various implementations of the method.

At block 150, the computer system may determine whether there is a next image; if so, the method may loop back to block 110.

At block 155, the computer system may identify the median string of each cluster of matching symbol sequences, such that the identified median string would represent the OCR result of the associated image fragment.

Figure 7A:
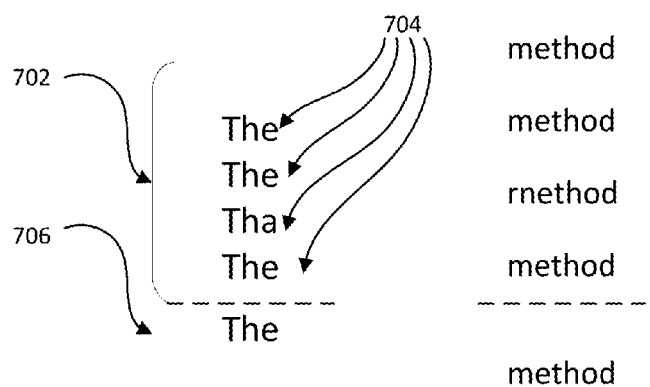
FIG. 7A schematically illustrates identifying the median string among a plurality of symbol sequences representing the OCR results of the corresponding image fragments, in accordance with one or more aspects of the present disclosure.

As schematically illustrated by FIG. 7A, each cluster 702 may comprise a plurality of matching symbol sequences 704, and the OCR result of the associated image fragment may be represented by the median string 706. In certain implementations, the median string may be identified as the symbol sequence having the minimal sum of edit distances to all symbol sequences of the cluster. The edit distance, which may in an illustrative example be represented by the Levenshtein distance, between a first symbol sequence and a second symbol sequence may be equal to the minimum number of single-symbol edits (i.e. insertions, deletions or substitutions) required to transform the first symbol sequence into the second symbol sequence.

Figure 7B:
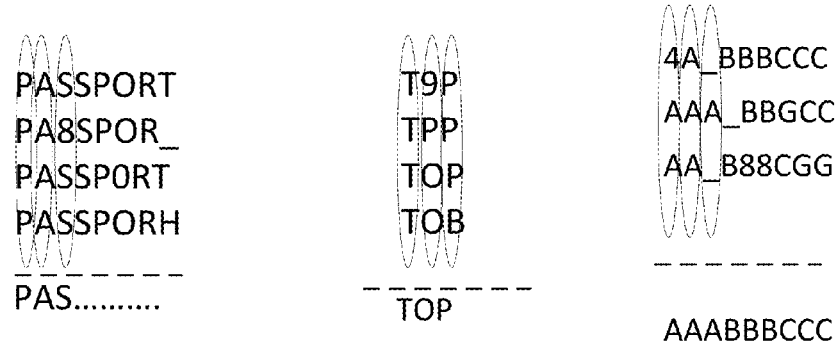
FIG. 7B schematically illustrates identifying the median string among a plurality of symbol sequences representing the OCR results of the corresponding image fragments, in accordance with one or more aspects of the present disclosure.
Figure 7C:
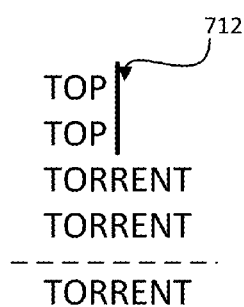
FIG. 7C schematically illustrates identifying the median string among a plurality of symbol sequences representing the OCR results of the corresponding image fragments, in accordance with one or more aspects of the present disclosure.

In certain implementations, the computational complexity of identifying the median string may be reduced by applying certain heuristics methods. In an illustrative example, the computer system may heuristically identify the zeroth-order approximation of the median string. The computer system may then align the symbol sequences using strictly matching symbols within each sequence, as schematically illustrated by FIG. 7B. In another illustrative example, the computer system may associate, with each symbol sequence of the cluster, a weight coefficient reflecting the position of the symbol sequence within the image or the OCR confidence metric. As schematically illustrated by FIG. 7C, a cluster 712 comprises four symbol sequences TOP, TOP, TORRENT, TORRENT. The first two symbol sequences represent partial words, since the distance from an edge of the minimum bounding rectangle of the symbol sequence to the edge of the image is less than the whitespace width. Therefore the OCR confidence metric value for the first two symbol sequences is significantly less than the OCR confidence metric value for the remaining two symbol sequences, and hence the symbol sequence TORRENT would be chosen as the median string by the method that takes into account the OCR confidence values.

Referring again to FIG. 1, at block 160, the computer system may identify the order, in which the symbol sequences representing the above-mentioned clusters should appear in the resulting text. As noted herein above, the images representing the original document may depict at least partially overlapping document fragments, and may differ by the image scale, shooting angle, shutter speed, aperture, image brightness, glaring, presence of external objects that at least partially cover the original text, and/or other image features, visual artifacts, and imaging process parameters. Therefore, the texts produced by the OCR of each individual image may differ by one or more words being present or absent in each OCR result, by variations in the symbol sequences representing the words of the original text, and/or by the order of the symbol sequences, as schematically illustrated by FIG. 5B.

In certain implementations, the computer system may compare a plurality of permutations of the symbol sequences that represent the identified clusters. The median permutation may be identified as the permutation having the minimal sum of Kendall tau distances to all other permutations. The Kendall tau distance between a first permutation and a second permutation may be equal to the minimum number of swapping operations required by the bubble sort algorithm to transform the first permutation into the second symbol permutation. In the above-referenced illustrative example of FIG. 5B, the median permutation is represented by the sequence ABCD.

As noted herein above, the original document cannot be fit into a single image without a significant loss of the image quality. The loss of image quality may be mitigated by acquiring a series of partially overlapping images of multiple fragments of the original document, which, however, may not be suitable for the subsequent OCR processing by common OCR methods. The above-described operation of determining the median permutation may be employed to combine the results of character recognition performed for the multiple document fragments, and thus to effectively "stitch" together the OCR results of individual images in order to produce the text of the original document.

In various implementations, the operations described by blocks 155 and 160 may be performed in the reverse sequence or in parallel. Alternatively, certain implementations may omit certain operations described by blocks 155 and/or 160.

Referring again to FIG. 1, at block 165, the computer system may utilize the ordering the symbol sequences representing the above-mentioned clusters, in order to produce the resulting text representing the original document.

As noted herein above, the text produced by the OCR systems and methods described herein may be further processed, e.g., by machine translation methods for translating the original text into another natural language. Since the methods described herein allow reconstructing the original text, and not only individual words, the machine translation methods may employ syntactic and/or semantic analyses of the original text in order to improve the translation quality.

Figure 8:
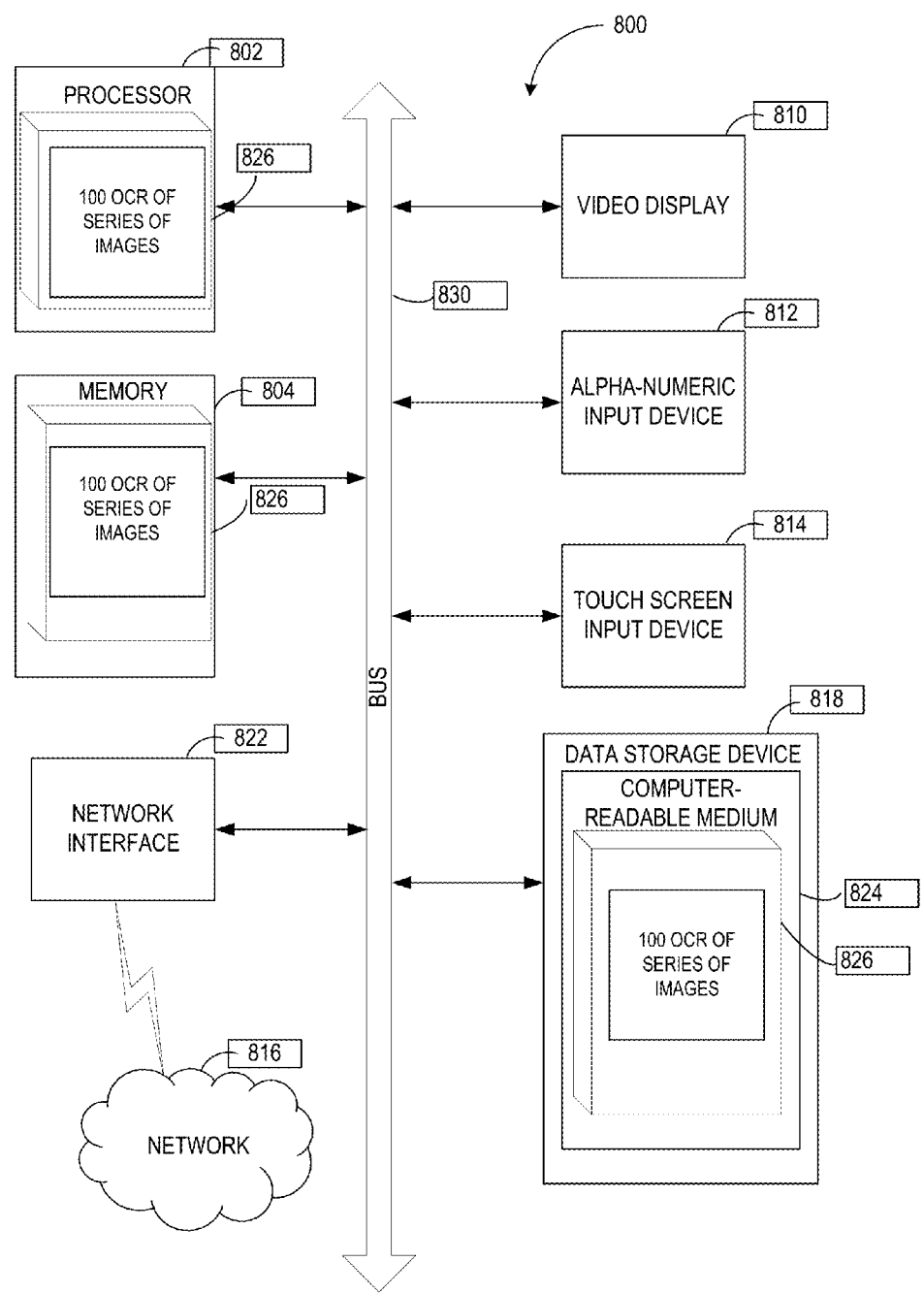
FIG. 8 depicts a diagram of an illustrative example of a computer system implementing the methods described herein.

FIG. 8 depicts a component diagram of an example computer system 800 within which a set of instructions, for causing the computer system to perform any one or more of the methods discussed herein, may be executed. The computer system 800may be connected to other computer system in a LAN, an intranet, an extranet, or the Internet. The computer system 800may operate in the capacity of a server or a client computer system in client-server network environment, or as a peer computer system in a peer-to-peer (or distributed) network environment. The computer system 800may be a provided by a personal computer (PC), a tablet PC, a set-top box (STB), a Personal Digital Assistant (PDA), a cellular telephone, or any computer system capable of executing a set of instructions (sequential or otherwise) that specify operations to be performed by that computer system. Further, while only a single computer system is illustrated, the term "computer system" shall also be taken to include any collection of computer systems that individually or jointly execute a set (or multiple sets) of instructions to perform any one or more of the methodologies discussed herein.

Exemplary computer system 800includes a processor 802, a main memory 804 (e.g., read-only memory (ROM) or dynamic random access memory (DRAM)), and a data storage device 818, which communicate with each other via a bus 830.

Processor 802 may be represented by one or more general-purpose processing devices such as a microprocessor, central processing unit, or the like. More particularly, processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute instructions 826 for performing the operations and functions of method 100 for performing OCR of a series of images comprising text symbols, as described herein above.

Computer system 800 may further include a network interface device 822, a video display unit 810, a character input device 812 (e.g., a keyboard), and a touch screen input device 814.

Data storage device 818 may include a computer-readable storage medium 824 on which is stored one or more sets of instructions 826 embodying any one or more of the methods or functions described herein. Instructions 826 may also reside, completely or at least partially, within main memory 804 and/or within processor 802 during execution thereof by computer system 800, main memory 804 and processor 802 also constituting computer-readable storage media. Instructions 826 may further be transmitted or received over network 816 via network interface device 822.

In certain implementations, instructions 826 may include instructions of method 100 for performing OCR of a series of images comprising text symbols, as described herein above. While computer-readable storage medium 824 is shown in the example of FIG. 8 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying," "modifying" or the like, refer to the actions and processes of a computer system, or similar electronic computer system, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Various other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
receiving, by a processing device, a current image of a series of images of an original document, wherein the current image at least partially overlaps with a previous image of the series of images;
performing optical character recognition (OCR) of the current image to produce an OCR text and a corresponding text layout;
identifying, using the OCR text and the corresponding text layout, a plurality of textual artifacts in each of the current image and the previous image, wherein each textual artifact is represented by a sequence of symbols that has a frequency of occurrence within the OCR text falling below a threshold frequency;
identifying, in each of the current image and the previous image, a corresponding plurality of base points, wherein each base point is associated with at least one textual artifact of the plurality of textual artifacts;
identifying, using coordinates of matching base points in the current image and the previous image, parameters of a coordinate transformation converting coordinates of the previous image into coordinates of the current image;
associating, using the coordinate transformation, at least part of the OCR text with a cluster of a plurality of clusters of symbol sequences, wherein the OCR text is produced by processing the current image and wherein the symbol sequences are produced by processing one or more previously received images of the series of images;

identifying an order of clusters of symbol sequences, the order reflecting a layout of the original document; and producing, in view of the order of clusters, a resulting OCR text representing at least a portion of the original document.

2. The method of claim 1, wherein the current image and the previous image represent consecutive images of the series of images of the original document.

3. The method of claim 1, wherein the current image and the previous image differ in at least one of: image scale, a shooting angle, image brightness, or presence of an external object that is covering at least part of the original document.

4. The method of claim 1, wherein identifying a base point further comprises determining a center of a minimum bounding rectangle of an associated textual artifact.

5. The method of claim 1, further comprising filtering the identified base points using invariant geometric features of base point groupings.

6. The method of claim 1, wherein the coordinate transformation is provided by a projective transformation.

7. The method of claim 1, further comprising:
identifying, for each cluster of symbol sequences, a median string representing the cluster.

8. The method of claim 7, wherein the median string has a minimal sum of values of a pre-defined metric with respect to the cluster of symbol sequences.

9. The method of claim 8, wherein the pre-defined metric represents an edit distance between the median string and a symbol sequence of the plurality of symbol sequences.

10. The method of claim 1, wherein identifying the median string comprises applying weight coefficients to each symbol sequence of the cluster of symbol sequences.

11. The method of claim 1, wherein identifying an order of clusters of symbol sequences comprises identifying a median of permutations of the clusters.

12. The method of claim 11, wherein the median of the permutations of the clusters has a minimal sum of Kendall tau distances to all other permutations.

13. The method of claim 1, wherein identifying the order of clusters further comprises:
producing a graph comprising a plurality of nodes, wherein each node represents a symbol sequence, the graph further comprising a plurality of edges, wherein an edge connects a first symbol sequence produced by OCR of at least a part of a first image of the series of images and a second symbol sequence produced by OCR of a corresponding part of a second image of the series of images.

14. The method of claim 1, wherein the OCR text is provided in a first natural language, the method further comprising:
translating the resulting OCR text to a second natural language.

15. A system, comprising:
a memory;
a processing device, coupled to the memory, the processing device configured to:
receive a current image of a series of images of an original document, wherein the current image at least partially overlaps with a previous image of the series of images;
perform optical character recognition (OCR) of the current image to produce an OCR text and a corresponding text layout;
identify, using the OCR text and the corresponding text layout, a plurality of textual artifacts in each of the current image and the previous image, wherein each textual artifact is represented by a sequence of symbols that has a frequency of occurrence within the OCR text falling below a threshold frequency;
identify, in each of the current image and the previous image, a corresponding plurality of base points, wherein each base point is associated with at least one textual artifact of the plurality of textual artifacts;
identify, using coordinates of matching base points in the current image and the previous image, parameters of a coordinate transformation converting coordinates of the previous image into coordinates of the current image;
associate, using the coordinate transformation, at least part of the OCR text with a cluster of a plurality of clusters of symbol sequences, wherein the OCR text is produced by processing the current image and wherein the symbol sequences are produced by processing one or more previously received images of the series of images;
identify an order of clusters of symbol sequences, the order reflecting a layout of the original document; and
produce, in view of the order of clusters, a resulting OCR text representing at least a portion of the original document.

16. The system of claim 15, wherein identifying a base point further comprises determining a center of a minimum bounding rectangle of an associated textual artifact.

17. The system of claim 15, wherein the median string has a minimal sum of values of a pre-defined metric with respect to the cluster of symbol sequences.

18. The system of claim 15, wherein identifying the order of clusters further comprises:
producing a graph comprising a plurality of nodes, wherein each node represents a symbol sequence, the graph further comprising a plurality of edges, wherein an edge connects a first symbol sequence produced by OCR of at least a part of a first image of the series of images and a second symbol sequence produced by OCR of a corresponding part of a second image of the series of images.

19. A computer-readable non-transitory storage medium comprising executable instructions that, when executed by a processing device, cause the processing device to:
receive a current image of a series of images of an original document, wherein the current image at least partially overlaps with a previous image of the series of images;
perform optical character recognition (OCR) of the current image to produce an OCR text and a corresponding text layout;
identify, using the OCR text and the corresponding text layout, a plurality of textual artifacts in each of the current image and the previous image, wherein each textual artifact is represented by a sequence of symbols that has a frequency of occurrence within the OCR text falling below a threshold frequency;
identify, in each of the current image and the previous image, a corresponding plurality of base points, wherein each base point is associated with at least one textual artifact of the plurality of textual artifacts;
identify, using coordinates of matching base points in the current image and the previous image, parameters of a coordinate transformation converting coordinates of the previous image into coordinates of the current image;

associate, using the coordinate transformation, at least part of the OCR text with a cluster of a plurality of clusters of symbol sequences, wherein the OCR text is produced by processing the current image and wherein the symbol sequences are produced by processing one or more previously received images of the series of images;

identify an order of clusters of symbol sequences, the order reflecting a layout of the original document; and produce, in view of the order of clusters, a resulting OCR text representing at least a portion of the original document.

20. The computer-readable non-transitory storage medium of claim 19, wherein identifying a base point further comprises determining a center of a minimum bounding rectangle of an associated textual artifact.

21. The computer-readable non-transitory storage medium of claim 19, wherein the median string has a minimal sum of values of a pre-defined metric with respect to the cluster of symbol sequences.

22. The computer-readable non-transitory storage medium of claim 19, wherein identifying the order of clusters:

producing a graph comprising a plurality of nodes, wherein each node represents a symbol sequence, the graph further comprising a plurality of edges, wherein an edge connects a first symbol sequence produced by OCR of at least a part of a first image of the series of images and a second symbol sequence produced by OCR of a corresponding part of a second image of the series of images.

* * * * *